United States Patent
Zhang et al.

(10) Patent No.: US 11,557,306 B2
(45) Date of Patent: Jan. 17, 2023

(54) METHOD AND SYSTEM FOR SPEECH ENHANCEMENT

(71) Applicant: Harman International Industries, Incorporated, Stamford, CT (US)

(72) Inventors: Guoxia Zhang, Shanghai (CN); Xiangru Bi, Shanghai (CN)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 16/651,799

(22) PCT Filed: Nov. 23, 2017

(86) PCT No.: PCT/CN2017/112644
§ 371 (c)(1),
(2) Date: Mar. 27, 2020

(87) PCT Pub. No.: WO2019/100289
PCT Pub. Date: May 31, 2019

(65) Prior Publication Data
US 2020/0294522 A1 Sep. 17, 2020

(51) Int. Cl.
*G10L 21/0208* (2013.01)
*G10L 15/02* (2006.01)
(Continued)

(52) U.S. Cl.
CPC .......... *G10L 21/0208* (2013.01); *G10L 15/02* (2013.01); *G10L 15/16* (2013.01);
(Continued)

(58) Field of Classification Search
CPC . G10L 21/0208; G10L 21/02; G10L 21/0272; G10L 21/03; G10L 21/0356;
(Continued)

(56) References Cited

U.S. PATENT DOCUMENTS

| | | | |
|---|---|---|---|
| 6,430,528 B1* | 8/2002 | Jourjine | G10L 21/0272 375/340 |
| 2009/0141908 A1* | 6/2009 | Jeong | H04R 3/005 381/92 |

(Continued)

FOREIGN PATENT DOCUMENTS

| | | | |
|---|---|---|---|
| CN | 103854660 A | 6/2014 | |
| CN | 104123948 A | 10/2014 | |

(Continued)

OTHER PUBLICATIONS

Sakanashi Ryutaro et al: "Speech enhancement with ad-hoc microphone array using single source activity", 2013 Asia-Pacific Signal and Information Processing Association Annual Summit and Conference, APSIPA, Oct. 29, 2013 (Oct. 29, 2013), pp. 1-6, XP032549785, DOI: 10.1109/APSIPA.2013.6694323 [retrieved on Dec. 24, 2013].

(Continued)

*Primary Examiner* — Leshui Zhang
(74) *Attorney, Agent, or Firm* — Angela M. Brunetti (57) ABSTRACT

A method and a system for speech enhancement including a time synchronization unit configured to synchronize microphone signals sent from at least two microphones; a source separation unit configured to separate the synchronized microphone signals and output a separated speech signal, which corresponds to a speech source; and a noise reduction unit including a feature extraction unit configured to extract a speech feature of the separated speech signal and a neural network configured to receive the speech feature and output a clean speech feature.

13 Claims, 8 Drawing Sheets

(51) Int. Cl.
  *G10L 15/16* (2006.01)
  *G10L 21/0272* (2013.01)
  *H04R 1/40* (2006.01)
  *G10L 25/30* (2013.01)
  *H04R 3/00* (2006.01)
(52) U.S. Cl.
  CPC .......... G10L 21/0272 (2013.01); H04R 1/406 (2013.01); H04R 2499/13 (2013.01)
(58) Field of Classification Search
  CPC ......... G10L 15/02; G10L 15/16; G10L 15/10; G10L 15/20; G10L 25/30; H04R 1/40; H04R 1/406; H04R 3/00; H04R 3/005; H04R 2499/10; H04R 2499/13
  USPC ....... 704/232, 233, 231, 243, 245, 216, 218; 381/17, 94.3, 94.4, 71.1, 66, 92, 86, 302; 455/99, 569.1, 569.2, 575.9, 238.1, 297, 455/345; 700/94
  See application file for complete search history.

(56) References Cited

U.S. PATENT DOCUMENTS

| | | |
|---|---|---|
| 2009/0214052 A1 | 8/2009 | Liu |
| 2009/0238377 A1* | 9/2009 | Ramakrishnan ...... G10L 21/028 381/92 |
| 2015/0138045 A1* | 5/2015 | Lee .......................... G09G 5/26 345/2.2 |
| 2016/0050694 A1* | 2/2016 | Pfaffinger ............. H04W 76/10 370/329 |
| 2016/0111107 A1 | 4/2016 | Erdogan et al. |
| 2016/0189730 A1* | 6/2016 | Du ...................... G10L 21/0272 704/233 |
| 2017/0323653 A1 | 11/2017 | Hassan Al Banna |

FOREIGN PATENT DOCUMENTS

| | | | |
|---|---|---|---|
| CN | 107068162 A | 8/2017 | |
| CN | 107251573 A | 10/2017 | |
| JP | 2008-020872 A * | 1/2008 | ............. G10L 15/00 |

OTHER PUBLICATIONS

Feng Xue et al: "Speech feature denoising and dereverberation via deep autoencoders for noisy reverberant speech recognition", 2014 IEEE International Conference on Acoustics, Speech and Signal Processing (ICCASSP), IEEE, May 4, 2014 (May 4, 2014), pp. 1759-1763, XP032617578, DOI: 10.1109/ICASSP.2014.6853900 [retrieved on Jul. 11, 2014].

* cited by examiner

METHOD AND SYSTEM FOR SPEECH ENHANCEMENT

TECHNICAL FIELD

The present disclosure relates to speech processing, and more particularly, relates to a method and a system for speech enhancement.

BACKGROUND ART

Speech recognition system in a vehicle permits driver and passengers to control various functions of the vehicle by speaking words and phrases, such as the functions of a navigator, an air conditioner, and even an automatic driver system. However, vehicle cabins may be noisy. Noise in a vehicle may come from several sources, such as, the engine, the wind, the tires, the air conditioner, the music, echoes, etc. A speech signal in light of such noise may yield an unfavorable signal-to-noise ratio (SNR), which may limit the effectiveness of the speech recognition system. Furthermore, a conventional vehicle may only include one microphone for picking up the speech signals. The placement of those microphones in the vehicle may be fixed. The low number of microphones and the placement thereof may also limit the effectiveness of speech enhancement and recognition systems.

In addition, in the conventional vehicle, two or more persons may simultaneously talk. In such cases, the low number of microphones and placement thereof may make it difficult for a speech separation system of the speech recognition system to separate the speech signals from the different speaking-persons. The speech separation system may, therefore, yield unfavorable separation results.

Therefore, there is a need for a method and a system for improving the speech separation, such as to create clear, separate signals, and noise reduction in the art.

SUMMARY OF THE INVENTION

According to one aspect of the disclosure, a system for speech enhancement is provided, which comprises a time synchronization unit configured to synchronize microphone signals sent from at least two microphones; a source separation unit configured to separate the synchronized microphone signals and output a separated speech signal corresponding to a speech source; a noise reduction unit including a feature extraction unit configured to extract a speech feature of the separated speech signal and a neural network configured to receive the speech feature and output a clean speech feature.

The system may be implemented in a vehicle, and the time synchronization unit, the source separation unit, and the noise reduction unit may be included in a head unit of a vehicle. One of the at least two microphones may be mounted in the vehicle. The system may be implemented in other environments, such as, an indoor environment (e.g., an office, home, shopping mall), an outdoor environment (e.g., a kiosk, a station), etc.

Further, one of the at least two microphones may be provided in a portable device.

Further, the time synchronization unit may be configured to synchronize the microphone signals by detecting energy of the microphone signals.

Further, the source separation unit may be configured to perform a clustering algorithm multiple times to obtain a plurality of clustering results and select the best result from the plurality of clustering results.

Further, the system may include a resample module for resampling at least one of the microphone signals before or after synchronization of the microphone signals.

Further, a model in the neural network is determined in advance by acquiring a set of training data, extracting a speech feature of the training data, determining a set of initiation parameters for the neural network, and training iteratively the parameters of the neural network according to the speech feature of training data and the initiation parameters.

According to another aspect of the disclosure, a method of speech enhancement is provided, which comprises synchronizing microphone signals sent from at least two microphones; separating the synchronized microphone signals and outputting a separated speech signal corresponding to a speech source; extracting a speech feature of the separated speech signal; and mapping the speech feature to a clean speech feature by a neural network.

The method may be implemented in a vehicle. One of the at least two microphones may be mounted in the vehicle. The method may be implemented in other environments, such as, an indoor environment (e.g., an office, home, shopping mall), an outdoor environment (e.g., a kiosk, a station), etc.

According to the present disclosure, it is possible to provide a desired clear speech from multichannel noisy speech so as to improve speech recognition rate without additional cost of the microphone arrays.

The significance and benefits of the present disclosure will be clear from the following description of the embodiments. However, it should be understood that those embodiments are merely examples of how the invention can be implemented, and the meanings of the terms used to describe the invention are not limited to the specific ones in which they are used in the description of the embodiments.

Other systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

BRIEF DESCRIPTION OF THE EMBODIMENTS

Hereinafter, the preferred embodiment of the present disclosure will be described in more detail with reference to the accompanying drawings. In the following description of the present disclosure, a detailed description of known functions and configurations incorporated herein will be omitted when it may make the subject matter of the present disclosure rather unclear.

Figure 1:
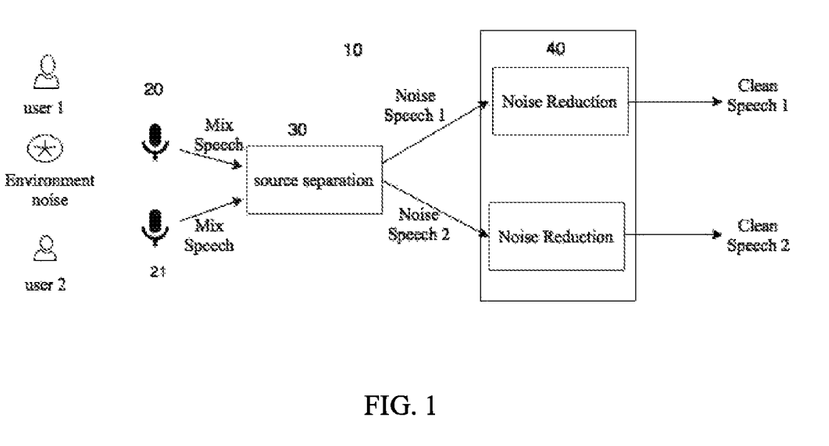
FIG. 1 is a functional schematic diagram of a system for speech enhancement according to an embodiment of the present disclosure.

The present disclosure provides a method and a system for speech enhancement according to an embodiment of the present disclosure. FIG. 1 is a functional schematic diagram of a speech processing system according to an embodiment of the present disclosure. The system may be arranged in a vehicle. For example, the system is implemented by the head unit of a vehicle. Nonetheless, the system may be provided in other environments, such as, an office, home, shopping mall, a kiosk, a station, etc.

As shown in FIG. 1, the system 10 includes a source separation unit 30 and a noise reduction unit 40.

One or more of the microphones 20 and 21 may be considered as a part of the system 10 or may be considered as being separate from the system 10. The microphones 20 and 21 may be provided in different devices, for example, one mounted in a vehicle, and another one mounted in a mobile device, such as, a mobile phone, a PDA, a tablet, a laptop, a wearable device, etc. The number of microphones as shown in FIG. 1 should not be understood as limiting, but merely as being chosen for illustrating purposes, and the number of microphones may be more than two. The microphones 20 and 21 sense the sound in the surrounding environment and send the sensed signals for further processing. Unlike the commonly used microphone array, the distance between the microphones is not limited.

If the microphones are not included in the same device, those microphones may be firstly synchronized, which will be described in detail hereinafter with reference to FIG. 2.

For illustrative purposes, the embodiment will be described by taking a vehicle as an example hereinafter. Referring to FIG. 1, the microphones 20 and 21 receive the sound in the vehicle, which may include the speech S1 from the user 1 (i.e., speech source 1) and/or the speech S2 from the user 2 (i.e., speech source 2), and the environment noise from multiple sources, including, but not limited to, the engine, air conditioner, wind, music, babble, echoes, etc. There may be more users (or speakers) in the vehicle. The mixed noisy sound X1 and the mixed noisy sound X2 respectively received by the microphones 20 and 21 are transmitted to the source separation unit 30, and then separated by the source separation unit 30. If only one user is talking, the source separation unit 30 outputs a noisy speech signal corresponding to that user; if two users speak simultaneously, the source separation unit 30 outputs two separated noisy speech signals each corresponding to one of the two users. If there are more than two users who speak simultaneously, the source separation unit 30 outputs individual noisy speech signals corresponding to the respective users. The separated noisy speech signal(s) outputted from the source separation unit 30 will be outputted to the noise reduction unit 40, which then outputs the clean speech signals. The noise reduction unit 40 must be placed behind the source separation unit 30 because some information required by source separation may be lost after the process of noise reduction. The noise reduction unit 40 uses a neural network to realize noise reduction by means of a mapping function between noisy speech and clean speech. The clean speech would be sent to a speech recognition unit (not shown in FIG. 1), which may be used for speech recognition. An example of the system including the source separation unit 30 and the noise reduction unit 40 will be described in detail hereinafter.

In order to obtain a desired result of the source separation, the system needs to obtain the speech signals from at least two microphones. If there is only one microphone deployed in the vehicle, a microphone on the portable device may be combined with the microphone deployed in the vehicle to realize the source separation and noise reduction.

Figure 2:
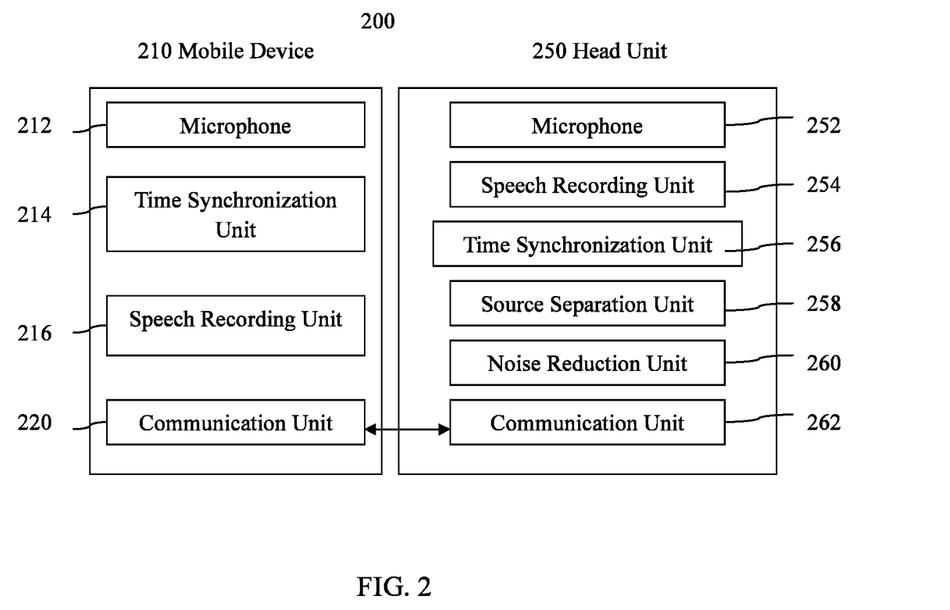
FIG. 2 is a block diagram of a system for speech enhancement according to an embodiment of the present disclosure.

FIG. 2 is a block diagram illustrating a system for speech enhancement according to an embodiment of the present disclosure.

As shown in FIG. 2, one microphone is located in the mobile device, and another microphone is mounted in the vehicle and considered as a part of the head unit. The microphone included in the head unit of the vehicle does not mean that the microphone must be physically contained in the head unit, but means that the microphone is connected to and controlled by the head unit. The microphone included in the head unit may be arranged at any place in the vehicle.

With reference to FIG. 2, the system includes a mobile device 210 and a head unit 250. The mobile device 210 includes a microphone 212, a time synchronization unit 214, a speech recording unit 216, and a communication unit 220 among others.

The time synchronization unit 214 may realize the clock synchronization between the mobile device and other device, such as, the head unit, and the clock synchronization may be realized by Network Time Protocol (NTP), Precision Time Protocol (PTP), Simple Network Time Protocol (SNTP), or the like. The time synchronization unit 214 may be implemented by hardware, software, or any combination thereof, such as, the corresponding software program performed by a central processor in the mobile device.

The microphone 212 receives the mixed noisy sound in the vehicle, which may include the speech sound from the user(s) and the environment noise in the vehicle. The environment noise may come from multiple sources inside and/or outside the vehicle. The microphone 212 then sends the mixed noisy speech signal to the speech recording unit 216, which stores the mixed noisy speech signal temporarily or permanently. The mixed noisy speech signal may include the speech signal from multiple sources.

The communication unit 220 may be used for a variety of communication protocols. For example, the communication unit 220 may support wireless communication, wired communication, or both. The wireless communication may include Wi-Fi, Bluetooth, or other communication protocol for information transmission between the mobile device and the head unit.

The aforesaid units in the mobile device may be implemented by adapting known hardware components in the mobile device for ready, efficient and economical application and utilization.

As shown in FIG. 2, the head unit 250 includes a microphone 252, a speech recording unit 254, a time synchronization unit 256, a source separation unit 258, a noise reduction unit 260, and a communication unit 262, among others.

The time synchronization unit 256 may realize the clock synchronization between the head unit and other device, such as, the mobile device, and the clock synchronization may be realized by Network Time Protocol (NTP), Precision Time Protocol (PTP), Simple Network Time Protocol (SNTP), or the like. The time synchronization unit 256 may be implemented by hardware, software, or any combination thereof, such as, the corresponding software program performed by a processor in the head unit.

The microphone 252 has the similar functions as that of the microphone 212. After receiving the mixed noisy sound in the vehicle, the microphone 252 sends the mixed noisy speech signal to the speech recording unit 254. The speech recording unit 254 stores the mixed noisy speech signal temporarily or permanently.

The speech recording unit 216 in the mobile device and the speech recording unit 254 in the head unit may be, but not limited to, a non-volatile memory (e.g., ROM, non-volatile random access memory (NVRAM), Flash memory, disc storage), a volatile memory (e.g., RAM, static random access memory (SRAM)), an internal memory, an external memory, or a combination thereof.

The source separation unit 258 and the noise reduction unit 260 respectively correspond to the source separation unit 30 and the noise reduction unit 40 as shown in FIG. 1. They may be implemented by hardware, software, or any combination thereof, such as, the corresponding software program performed by the central processor in the head unit. The details of the source separation unit 258 and the noise reduction unit 260 will be provided hereinafter with reference to FIG. 4 to FIG. 8.

The communication unit 262 may be used for a variety of communication protocols. For example, the communication unit 262 may support wireless communication (e.g., Wi-Fi, Bluetooth), or wired communication, or both. Since the communication modules in most vehicles and most mobile devices support Bluetooth protocol, there may be no need to modify the hardware of the head unit and/or the mobile device for communication therebetween, which is cost effective.

This embodiment is especially useful for the head unit including only one microphone. A microphone included in the mobile device carried with a person may be used together with the microphone in the head unit to realize the source separation.

Alternatively, if there are at least two microphones included in the head unit for receiving the mixed noisy sound, the system 200 may include only the head unit 250. That is to say, the mobile device 210 is not indispensable for such a system. In this case, the head unit 250 does not need to communicate with the mobile device 210 via the communication unit for time synchronization and information transmission.

Figure 3:
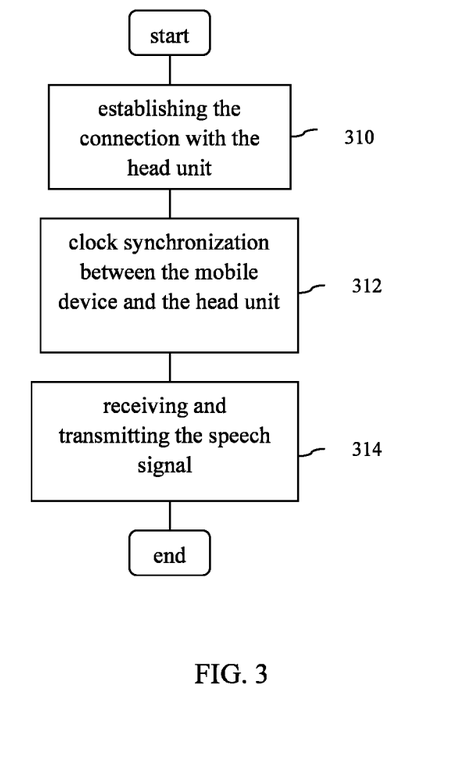
FIG. 3 is a flow diagram of the mobile device for clock synchronization and information transmission with the head unit according to an embodiment of the present disclosure.

FIG. 3 is a flow diagram of the mobile device 210 for clock synchronization and information transmission with the head unit 250 according to an embodiment of the present disclosure.

The mobile device 210 may include an application for performing the process of the speech receiving and transmitting for subsequent speech recognition in the head unit.

After the application starts, the mobile device 210 initials the connection with the head unit 250. The connection between the mobile device 210 and the head unit 250 may be established through a variety of networks, such as, a wireless network, a wired network, etc., as shown in a block 310. Preferably, the network for connecting the mobile device 210 and the head unit 250 is Bluetooth or Wi-Fi because most vehicles support those two protocols and thus there is no need to modify the hardware of the head unit for establishing the connection.

After establishing the connection between the mobile device and the head unit, the clock synchronization between the mobile device and the head unit should be performed, as shown in a block 312. Taking NTP as an example for clock synchronization, the head unit is usually used as the NTP server, and the time synchronization unit 214 of the mobile device 210 adjusts the clock of the mobile device 210 to be synchronized with the time of the head unit 250. Alternatively, the mobile device 210 may be used as the NTP server, and then the time synchronization unit 256 of the head unit 250 adjusts the clock of the head unit to be synchronized with the time of the mobile device. The clock synchronization may be realized by other specific steps or other protocols.

The clock synchronization between the mobile device 210 and the head unit 250 ensure the clock synchronization between the speech signal sent from the mobile device 210 and the speech signal received from the microphone in the head unit 250.

After the clock synchronization, the mobile device is ready for receiving and transmitting the speech signal.

When the person(s) in the vehicle speaks, the speech sound together with the environment noise will be received by the microphone 212 of the mobile device 210, and then the mobile device 210 will send the mixed noisy speech signal to the head unit 250.

Figure 4:
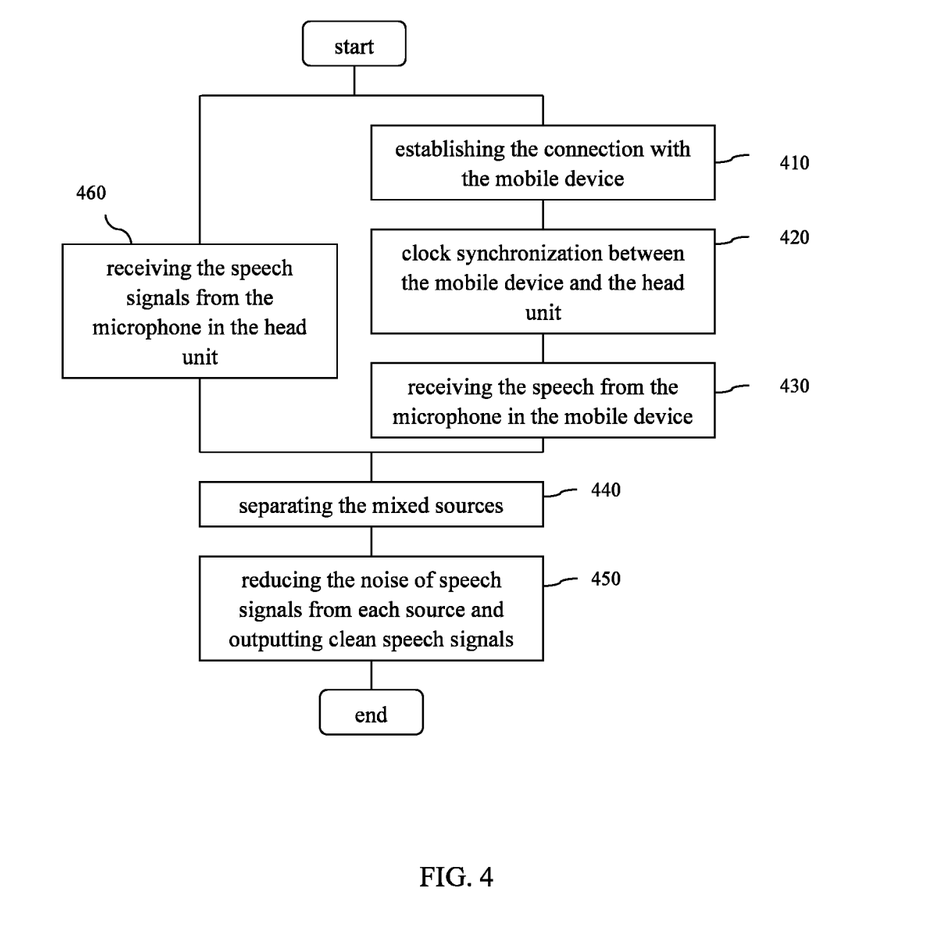
FIG. 4 is a flow diagram of the head unit for establishing connection and clock synchronization with the mobile device and speech enhancement according to an embodiment of the present disclosure.

FIG. 4 illustrates a flow diagram of the process performed by the head unit for connection establishing and clock synchronization with the mobile device and for speech enhancement.

As shown in the block 410 and the block 420, the head unit 250 can establish the connection with the mobile device 210 after receiving the connection request from the mobile device 210 and perform the time synchronization with the mobile device 210, which have been described with reference to FIG. 3.

After the time synchronization, the head unit 250 is ready to receive the signal from the mobile device 210 as shown in the block 430.

Besides the microphone of the mobile device 210, the speech signal may be received from the microphone of the head unit 250 as shown in the block 460.

If the microphone of the mobile device 210 and the microphone of the head unit 250 have different sample rate, the head unit 250 may resample the mixed noisy speech signal sent from the mobile device 210 by a resample module so that the signals (i.e., two mixtures) from the two microphones have the same sample rate.

Furthermore, the mixed noisy speech signals from the two microphones may be further synchronized in the head unit 250 by detection and alignment of the starting points of the signals from different microphones. The detection of the starting points of the speech signals may be performed by detecting the distinct change of the signals, such as the distinct change of the power or the energy of the signals. For example, the energy detection method may be used to detect the starting points. The detection and alignment of the starting points of the speech signals from different microphones will improve the accuracy of the subsequent source separation and the noise reduction processes.

The sequence of the resample of the mixed noisy speech signal from the mobile device 210 and the detection and alignment of the starting points of the speech signals is not limited.

Then, as shown in the block 440 and the block 450, the mixed noisy sound signals are subsequently entered into the source separation unit 258 and the noise reduction unit 260, and the clean speech are then outputted from the noise reduction unit 260 for further processing, such as, speech recognition.

The blocks 410-430 may be omitted and only the block 460 is performed when the mobile device is not included in the system.

Figure 5:
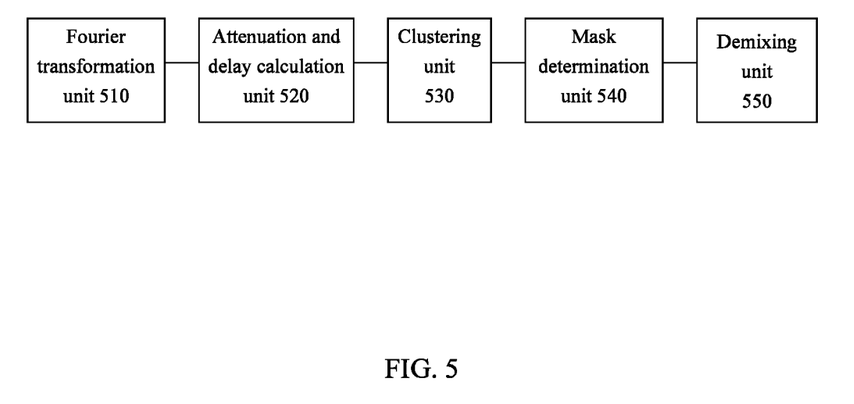
FIG. 5 is a functional block diagram of the source separation unit according to an embodiment of the present disclosure.

FIG. 5 is a functional block diagram of the source separation unit according to an embodiment of the present disclosure.

The source separation unit may include a Fourier transformation unit 510, an attenuation and delay calculation unit 520, a clustering unit 530, a mask determination unit 540, and a demixing unit 550.

Since it is unlikely for two users to excite the same frequency at the same time, the speeches from a plurality of users may be considered as statistically independent, and thus the speech signals from multiple sources may be considered as W-disjoint orthogonal, for which the degenerate unmixing estimation technique (DUET) method may be utilized.

Figure 6:
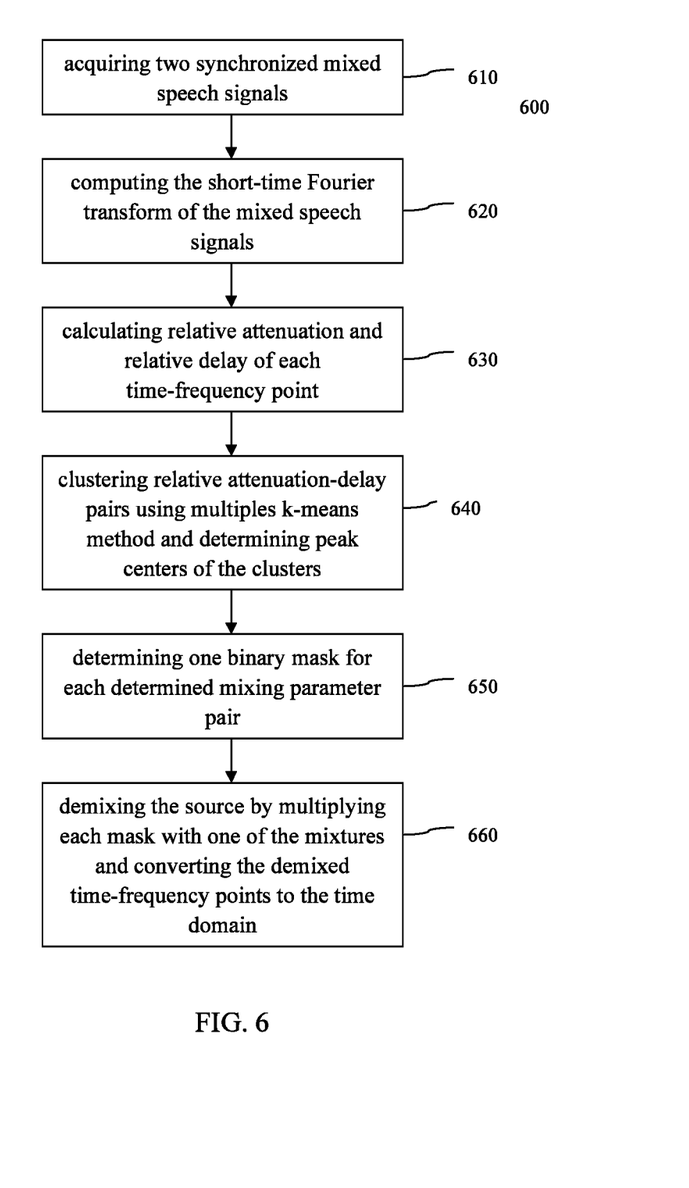
FIG. 6 is a flow diagram of the source separation according to an embodiment of the present disclosure.

Referring to FIG. 6, a flow diagram of the source separation is shown. The source separation unit receives multiple synchronized mixed speech signals from the time synchronization unit (block 610). For example, for the embodiment as shown in FIG. 1, the source separation unit receives two synchronized mixed speech signals. Then, the Fourier transformation unit 510 in the source separation unit may perform short-time Fourier transform (windowed Fourier transform) of the mixed speech signals and output lots of time-frequency points (block 620).

The source separation is implemented by partitioning the time-frequency points of one of the mixed speech signals. In order to partitioning the time-frequency points, a relative arrival delay and a relative attenuation factor are calculated, where the relative arrival delay is the time difference between the arrival times from one of the sources to two microphones, and the relative attenuation factor corresponds to the ratio of the attenuations of the paths between one of the sources and two microphones. The relative arrival delay and the relative attenuation factor corresponding to one of the sources should be respectively different from those corresponding to another one of the sources, and thus the time-frequency points may be partitioned according to the different relative delay-attenuation pairs.

The attenuation and delay calculation unit 520 calculates the relative attenuation and relative delay of each time-frequency point (block 630). The calculation of the relative attenuation and delay may be calculated by a known method in the art.

Then, the calculated attenuation-delay pairs are clustered by the clustering unit 530 with a clustering algorithm, such as K-means method (block 640). In addition, the clustering algorithm, such as, the K-means method, may be performed multiple times for selection of the best clustering result from the multiple results so as to determine an estimated peak centers of the clusters. The minimum sum of the distances from the points to the peak may be selected as the best clustering result. The number of the peaks corresponds to the number of sources. After clustering process, the attenuation-delay pairs have been combined into a number of groups each corresponding to one source. Performing multiple times of the clustering algorithm may optimize the clustering results and improve the speech separation.

In block 650, the mask determination unit 540 determines a binary mask for each time-frequency point according to the group that the attenuation-delay pair belongs to, where the attenuation-delay pair corresponds to the time-frequency point generating the attenuation-delay pair. For example, the mask determination unit 540 may assign "1" for the speech source 1, and assign "0" for the speech source 2. After that, the demixing unit 550 may demix the sources by multiplying each mask with each time-frequency point and may convert the time-frequency points into the time domain if necessary (block 660).

Referring back to FIG. 1, the separated noise speech 1 and the separated noise speech 2 may be processed by the noise reduction unit 40 sequentially. The noise reduction unit 40 will be described in detail with reference to FIG. 7 and FIG. 8.

Figure 7:
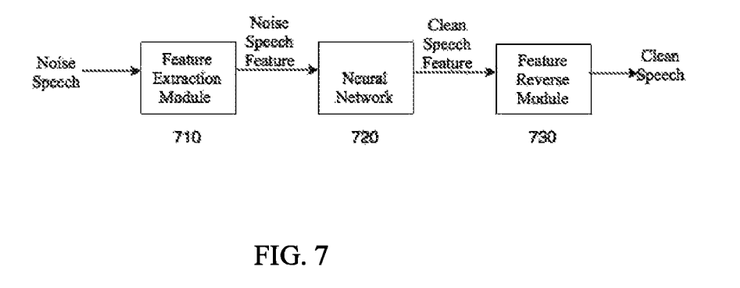
FIG. 7 is a block diagram of the noise reduction unit according to an embodiment of the present disclosure.
Figure 8:
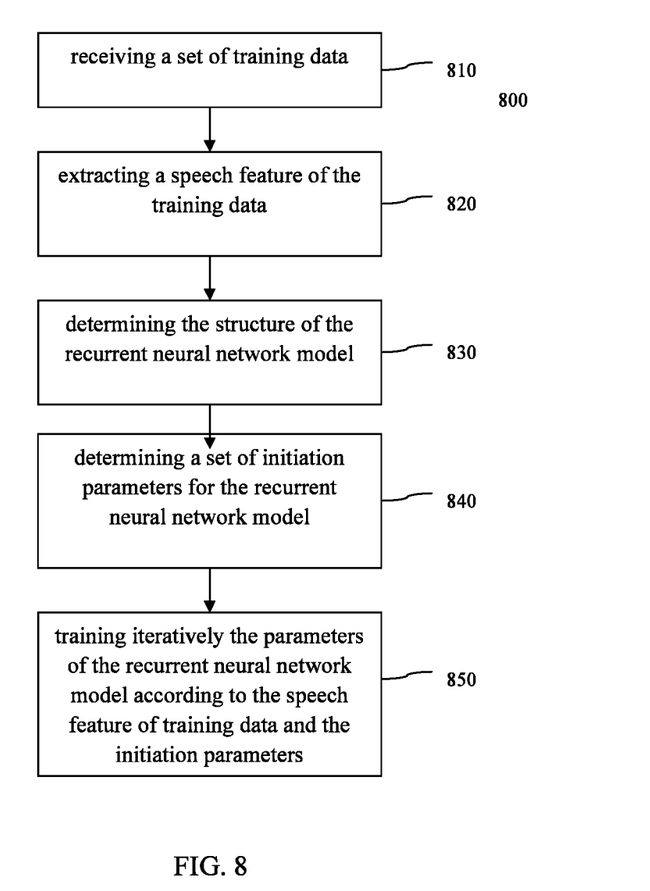
FIG. 8 is a flow diagram of the neural network training according to an embodiment of the present disclosure.

FIG. 7 is a block diagram of the noise reduction unit according to an embodiment of the present disclosure. FIG. 8 is a flow diagram 800 of the neural network training according to an embodiment of the present disclosure.

The noise reduction unit as shown in FIG. 7 may include a feature extraction module 710, a neural network 720, and a feature reverse module 730. The network model of the neural network 720 may include a certain deep neural network (DNN) to learn the mapping from noisy speech to clean speech, such as, the regression deep neural network, recurrent neural network (RNN), or the model based on the recurrent neural network with long short-term memory (LSTM). In addition, the neural network 720 may be a supervised deep neural network. The neural network 720 may include one or more DNNs.

In order to be able to handle a wide range of additive noises in the real-world situations, a large training set that encompasses many possible combinations of various types of speeches and noises may be used to train the network model (block 810). Various types of the noisy and clean speeches may be stored in the system, in an external storage device, or in the online database. The training data may include the clean speech data corrupted with various types of noises at different levels of signal noise ratio (SNR), such as, 20 dB, 15 dB, 10 dB, 5 dB, 0 dB, −5 dB, etc., which simulates noise-corrupted speech signals in different operation scenarios. Alternatively, the training data may include only the noisy data. The noise data may represent the noise from multiple sources, such as, the engine, air conditioner, wind, music, babble, echoes.

After the training data is inputted in the noise reduction unit, the acoustic feature of the training data may be extracted as the input of the network model by the feature extraction module 710 (block 820). The feature to be extracted may be, but not limited to, log-power spectral feature, relative autocorrelation sequence MFCC (mel-frequency cepstrum coefficient) (RAS_MFCC), Gabor filter bank (GFB), power normalized cepstral coefficients (PNCC), etc.

Taking the recurrent neural network as an example, the topological structure of the recurrent neural network may be predetermined (block 830) and then a set of initiation parameters (weights) for the network model may be also predetermined (block 840). Generally, the recurrent neural network may include an input layer, an output layer, and one or more hidden layer. The number of the input and output nodes are related to the dimension of the extracted features of the training data, and the number of the hidden layers and the number of the nodes of the hidden layers may be determined according to the experience and/or experiments. The initiation parameters may also be determined according to the experience and/or experiment.

At block 850, the parameters of the network model are trained according to the speech feature of the training data and the initiation parameters. Then, the network model is trained based on the parameters which are tuned under supervision according to a training algorithm. The training may be iteratively performed until the output error (defined as the difference between the desired and the actual outputs) is below a predetermined threshold.

The network model may be trained before or after the system is loaded and/or mounted in the vehicle. For example, the network model may be trained and modified by using the samples stored in the online database according to the instruction sent from the online server, and the network model may be trained and modified by using the speech samples collected from the user of the vehicle.

After aforesaid training, a well-trained network model may be obtained for the noise reduction, and the neural network would have generalization ability for the unintended environment, such as, the unintended noise, the unintended speaker.

The process for the noise reduction will be described with reference to the noise reduction unit as shown in FIG. 7 hereinafter. As shown in FIG. 7, the separated noisy speech signals are entered into the noise reduction unit for feature extraction. The feature extraction module 710 extracts an acoustic feature from the separated noisy speech signals, and sends the noise speech feature to the neural network 720 for noise reduction, which then produces the clean speech feature with the well-trained network model and outputs the clean speech feature to the feature reverse module 730. The clean speech is then outputted by the feature reverse module 730 for further processing, such as, speech recognition.

The system in the aforesaid embodiments of the present disclosure may realize the speech separation and noise reduction and provide desired clean speeches for multichannel speech recognition by only two microphones, and thus improve the accuracy and the efficiency of the speech recognition. The system may be implemented with low cost and relatively low complexity. In addition, the system may combine the microphone on the portable device if necessary so as to adapt to various scenarios, such as, most existing vehicles.

It will be understood by persons skilled in the art, that one or more units, processes or sub-processes described in connection with FIGS. 1-8 may be performed by hardware and/or software. If the process is performed by software or the unit is implemented by software, the software may reside in software memory (not shown) in a suitable electronic processing component or system, and may be executed by the processor. The software in the memory may include executable instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device, such as, a RAM, a ROM, an EPROM, etc.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the disclosure have been described, it will be apparent to those of ordinary skill in the art that many more embodiments and implementations are possible that are within the scope of the disclosure. Accordingly, the disclosure is not to be restricted except in light of the attached claims and their equivalents.

The invention claimed is:

1. A system for speech enhancement, comprising:
a first time synchronization unit in a portable device configured to synchronize a clock of the portable device with a clock on a head unit on a vehicle, microphone signals are sent from at least one microphone in the portable device to the head unit to synchronize the microphone signals between the signals sent from the portable device and a microphone signal received at a microphone in the head unit;
a second time synchronization unit in the head unit of the vehicle, the second time synchronization unit further synchronizes the microphone signals at the head unit, the second time synchronization unit detects a distinct change in energy of the microphone signals to determine a starting point and aligns the starting points of the microphone signals sent from the at least one microphone in the portable device and the microphone in the head unit;
a source separation unit configured to separate the synchronized microphone signals and output a separated speech signal, which corresponds to a speech source; and
a noise reduction unit including a feature extraction unit configured to extract a speech feature of the separated speech signal and a neural network configured to receive the speech feature and output a clean speech feature.

2. The system of claim 1, wherein the source separation unit is configured to perform a clustering algorithm multiple times to obtain a plurality of clustering results and select a best result from the plurality of clustering results.

3. The system of claim 1 further comprising, a resample module for resampling at least one of the microphone signals before or after synchronization of the microphone signals.

4. The system of claim 1, wherein a model in the neural network is determined in advance by:
acquiring a set of training data;
extracting a speech feature of the training data;
determining a set of initiation parameters for the neural network; and
training iteratively a set of parameters of the neural network according to the speech feature of training data and the set of initiation parameters.

5. The system of claim 1, wherein the neural network is a supervised deep neural network.

6. The system of claim 1, wherein the second time synchronization unit, the source separation unit, and the noise reduction unit are included in the head unit of the vehicle.

7. A method of speech enhancement, comprising the steps of:
establishing a connection between a portable device and a head unit on a vehicle;
synchronizing, in a first time synchronization unit on the portable device, a clock on the portable device with a clock on the head unit;
synchronizing, in a second time synchronization unit on the head unit, microphone signals sent from at least one microphone on the portable device and at least another microphone on the head unit, the step of synchronizing, in the second time synchronization unit, further comprises:
detecting a signal energy of signals from at least two microphones, wherein the at least two microphone comprise the at least one microphone on the portable device and the at least another microphone on the head unit of the vehicle;
defining a starting point for each of the microphone signals by detecting a distinct change in the signal energy of the signals from each of the at least two microphones; and
synchronizing the microphone signals sent from the at least two microphones by aligning the starting points;
separating the synchronized microphone signals and outputting a separated speech signal, which corresponds to a speech source;
extracting a speech feature of the separated speech signal; and
mapping the speech feature to a clean speech feature by a neural network.

8. The method of claim 7, wherein the step of separating the synchronized microphone signal further comprises the step of performing a clustering algorithm multiple times to obtain a plurality of clustering results and selecting a best result from the plurality of clustering results.

9. The method of claim 7, further comprising the step of resampling at least one of the microphone signals before or after synchronizing the microphone signals.

10. The method of claim 7, wherein a model in the neural network is determined in advance by:
acquiring a set of training data;
extracting a speech feature of the training data;
determining a set of initiation parameters for the neural network; and
training iteratively a set of parameters of the neural network according to the speech feature of training data and the set of initiation parameters.

11. The method of claim 7, wherein the neural network is a supervised deep neural network.

12. The method of claim 7, wherein the synchronizing, separating, extracting and mapping are performed in the head unit of the vehicle.

13. A non-transitory computer readable storage medium, comprising computer executable instructions executed by a processor to:
synchronize, in a first time synchronization unit, a clock on a mobile device with a clock on a head unit on a vehicle;
acquire, at the head unit on the vehicle, a set of training data;
detect an energy of each of microphone signals from at least one microphone on the head unit and from a microphone on the mobile device;
define a starting point for each of the microphone signals from the at least one microphone on the head unit and from the microphone on the mobile device by detecting a distinct change in energy of the microphone signals;
align, at a second time synchronization unit on the head unit, the starting points of the microphone signal from the at least one microphone on the head unit and the microphone signal from the microphone on the mobile device;
extract a speech feature of the training data;
determine a set of initiation parameters for the neural network; and
iteratively train the parameters of the neural network according to the speech feature of training data and the initiation parameters.

* * * * *